May 17, 1966  A. L. GIRARDI  3,251,446
FRUIT RECEPTACLE FOR ORCHARD APPARATUS
Filed March 25, 1964
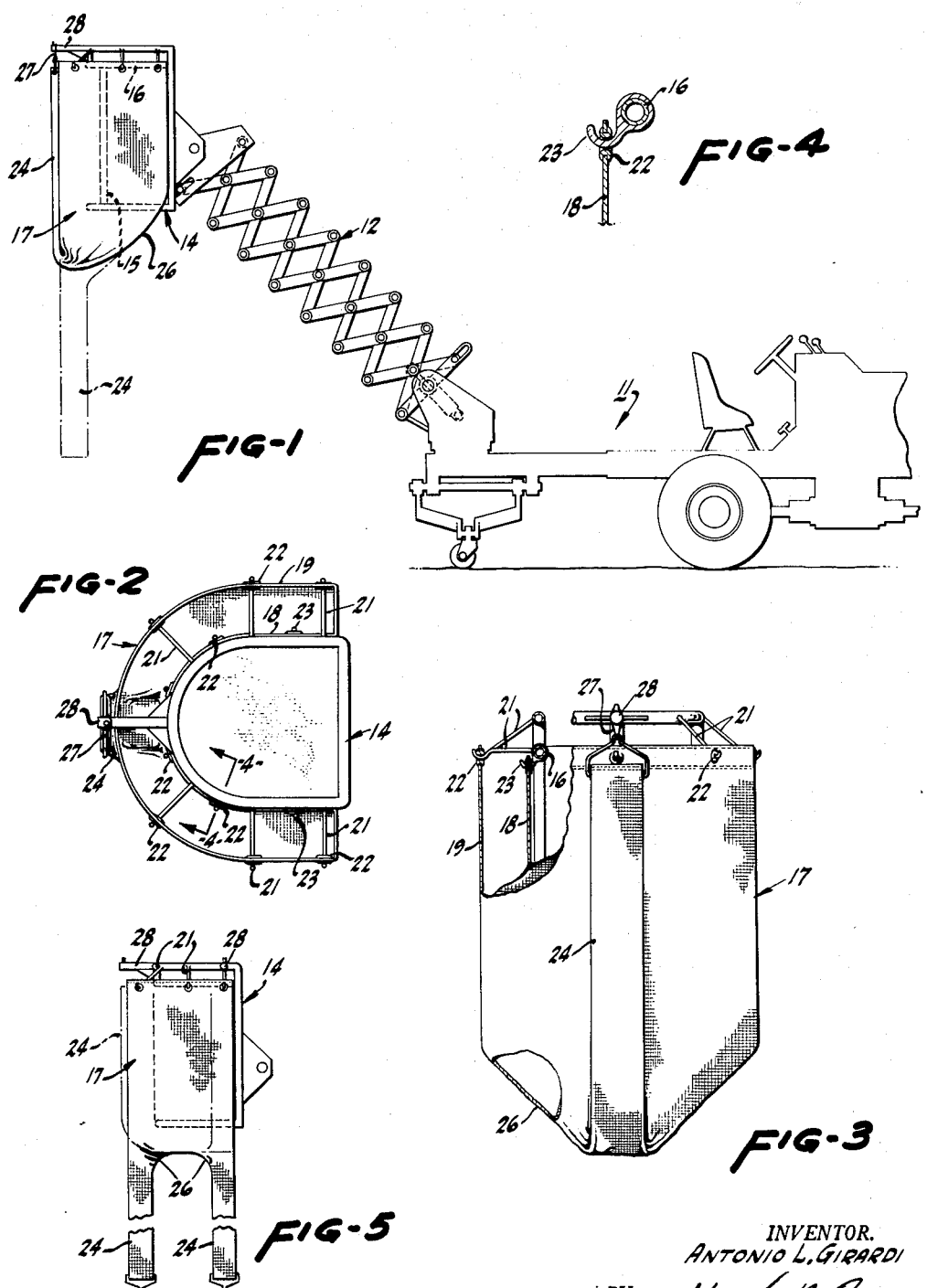
INVENTOR.
ANTONIO L. GIRARDI
BY
ATTORNEY

United States Patent Office 3,251,446
Patented May 17, 1966

3,251,446
FRUIT RECEPTACLE FOR ORCHARD
APPARATUS
Antonio Lawrence Girardi, Stockton, Calif.
(758 Acacia, Salinas, Calif.)
Substituted for abandoned application Ser. No. 68,058,
Nov. 8, 1960. This application Mar. 25, 1964, Ser. No.
357,007
7 Claims. (Cl. 193—7)

This invention relates to fruit pickers' equipment, and more particularly to a receptacle arranged to be attached to a boom supported platform upon which a picker may stand and by which he may be moved to desired positions relative to an adjacent tree.

The fruit receptacle of the present invention is particularly intended for use in connection with apparatus of the character disclosed in my Patents No. 2,798,623 and No. 2,927,705, and provides an alternate means for delivering fruit from the hands of a picker to a desired delivery point on or near the apparatus.

It is among the objects of my invention to provide a fruit picking receptacle which may be detachably secured in an accessible position partially surrounding a picker's platform as it is manipulated about a tree by mobile apparatus of the general character of my patents above referred to.

It is also an object of the invention to provide a receptacle of a size and shape suitable for receiving and retaining a relatively large amount of fruit and from which the collected fruit may be delivered periodically while the platform and picker remain in elevated picking position.

Another object is to provide a receptacle of the character described provided with a flexible tube-like spout which may be used both as a valve for retaining the fruit in the receptacle and as a channel through which fruit may flow from the receptacle to a delivery point.

Further objects include the provision of a receptacle of durable yet inexpensive construction, which may be easily attached and detached as required, and which permits fruit to be harvested with increased efficiency and with a minimum of injury to the fruit.

I accomplish these and other objects, some of which, with the foregoing, will be more fully explained in the following specification, by means of the device shown in the accompanying drawings forming a part of this specification. The invention, of course, is not limited to the illustrative embodiments of the device shown in the drawings, as the invention may be otherwise embodied within the scope of the appended claims.

In the drawings:

FIG. 1 is a fragmental side elevational view of a portion of a unit of orchard apparatus showing an extensible boom and picker's platform equipped with a fruit receptacle embodying the present invention;

FIG. 2 is a plan view of the platform and fruit receptacle of FIG. 1, the figure being drawn upon a slightly larger scale;

FIG. 3 is an elevational view of the platform and receptacle as viewed from the left-hand side of FIG. 1;

FIG. 4 is a fragmental sectional view illustrating one way of attaching the receptacle to the platform; and FIG. 5 is a fragmental view of a portion of a receptacle of a modified form provided with a plurality of outlet spouts.

In terms of broad inclusion, the fruit receptacle of the present invention comprises a bag-like receptacle formed of pliable sheet material such as canvas, or its equivalent, the bag being shaped to extend around the major portion of a fruit-picker's platform as it is suspended upon and manipulated by a boom to support a picker in desired positions about a tree, the receptacle being provided with spout means by which fruit may be retained in the receptacle until it is filled to a desired level and through which the fruit may be directed to a desired delivery point. The invention contemplates a receptacle of a size adapted to contain a relatively large quantity of fruit, preferably approximating the quantity that may normally be harvested from a quadrant of a mature fruit tree.

In terms of greater detail, the numeral 11 is used to designate in general the mobile carriage of a fruit harvesting machine provided with an angularly movable extensible boom 12 on the outer end of which is suspended a platform 14 upon which a fruit picker may stand and by which the may be moved to various positions about an adjacent tree, as fully explained in my patents above referred to. The platform is provided with a guard wall 15 which extends upwardly from the platform and in effect forms a basket in which the picker stands and which guards against his fall from the platform. For purpose of the present invention, the guard wall 15 may be topped with a rail 16 positioned about waist high with respect to a picker of average height when standing upon the platform.

A fruit receptacle designated in general by the numeral 17 is detachably supported by the rail 16. The receptacle is a bag-like container formed of canvas-like material and shaped to extend a major portion of the distance around the platform. The receptacle comprises an inner wall portion 18 arranged to hang more or less closely against the sides and outer end of the platform guard wall 15. An outer wall portion 19 is spaced outwardly from the inner wall 18. Stays 21 may be provided to hold the top of the receptacle open, with the outer wall spaced substantially uniformly from the inner wall along its entire length.

The inner wall 18 is attached to the top rail 16 by any suitable type of separable fastening device. One simple fastening shown in FIG. 4 comprises grommets 22 attached to the upper edge of the inner wall 18 at desired intervals and arranged to engage hooks 23 secured to the top rail 16 at corresponding intervals. Any other conventional form of fastening or supporting means may be substituted for the grommet and book arrangement illustrated.

A spout 24 is provided at the lower end of the receptacle 17. The spout is preferably a relatively long tubular member formed of flexible sheet material of a canvas-like character. When folded upwardly, as shown in full lines in the drawings, the spout closes the bottom of the receptacle. When the spout is lowered, as indicated in dotted lines in FIGS. 1 and 3, fruit may flow through the tubular spout member to a desired point of delivery, as, for example, boxes or hampers stacked at intervals throughout the orchard and in which the fruit may be transported from the orchard to a packing plant or cannery. Preferably, the bottom of the receptacle is inclined as at 26 from the ends of the receptacle to a spout which is positioned near the center. The inclined bottom portions serve to funnel the fruit to the spout and prevent the retention of fruit in the corners of the receptacle. If desired, additional spouts may be provided midway along the side portions of the receptacle, as indicated in FIG. 5 of the drawings.

A cord 27, or other suitable control device, is preferably provided by which the free end of the spout 24 may be raised and lowered by the picker while he stands upon the platform. Such a cord may be attached to the spout in any suitable manner, and may be tied to any convenient portion of the platform, or to a hook or equivalent member 28 attached on the guard wall or top rail.

In operation, the receptacle is secured in place upon the platform at the start of the picking operation. The picker draws the spout up to its raised position where it remains until the receptacle is filled to a desired level. The picker then lowers the free end of the spout to a point which will permit fruit to flow from the spout. The spout (or spouts) may be readily manipulated by the picker, or by a workman working from ground level, to direct the fruit to a desired point of delivery, as, for example, into boxes or tanks which, when filled, may be stacked for future removal from the orchard. The size of the receptacle is preferably such as to accommodate the fruit harvested from one or even two quadrants of a tree so that the receptacle need be emptied only at times when the harvesting apparatus is about to be advanced along the aisle between adjacent rows of trees. Boxes or hampers containing the picked fruit are left behind as the apparatus advances, and may be collected by other workmen at their convenience.

Having thus described my invention, I claim:

1. A fruit receptacle for mobile orchard apparatus having a platform movable by a boom to support a picker at selected positions around a tree comprising a bag formed of pliable sheet material shaped to extend peripherally around a major portion of the platform, the top of the bag being open to receive fruit as it is picked, means for supporting the bag with its upper edge positioned about waist high relative to a picker standing upon the platform, and flexible spout means normally held in an upwardly folded bag closing position and arranged to be released to a downwardly depending fruit delivering position.

2. A fruit receptacle for mobile orchard apparatus as defined by claim 1 wherein the platform is provided with a peripheral guard extending upwardly from the platform and the upper edge of an inner wall portion of the bag is provided with fastening means arranged to engage corresponding supports mounted upon the guard.

3. A fruit receptacle for mobile orchard apparatus as defined by claim 1 wherein the spout means comprises a relatively long tube of flexible material adapted to be folded upwardly by means accessible to the workman for closing the bottom of the bag while fruit is being picked and being arranged to be lowered by the workman to deliver fruit from the bag when it has been filled to a desired degree.

4. A fruit receptacle for mobile orchard apparatus as defined by claim 1 wherein the bag supporting means comprises hooks secured to a rail supported above the platform to guard the workman from falling from the platform, said hooks being engageable by matching fastening means upon the upper wall portion of the bag.

5. A fruit receptacle for mobile orchard apparatus as defined by claim 1 wherein the spout means comprises a plurality of spouts positioned at intervals between its ends, and the bag having bottom portions inclining downwardly toward each spout.

6. The combination with a mobile orchard apparatus provided with an extensible boom mounted for angular movement about horizontal and vertical axes and having a platform suspended from the outer end of the boom for movement by the boom to support a picker at a desired position relative to an orchard tree and which platform is provided with a guard rail positioned about waist high relative to a workman standing upon the platform of a flexible fruit receptacle detachably connected to the guard rail and depending therefrom along a major portion of the periphery of the platform, said receptacle being provided with a flexible delivery spout arranged to be elevated to close the bottom of the receptacle and to be lowered to permit a flow of fruit from the receptacle.

7. A fruit receptacle for mobile orchard apparatus comprising spaced inner and outer wall portions shaped to extend peripherally around a guard rail carried by a boom actuated platform, bottom panels connecting the lower edges of the wall portions, said panels being inclined angularly downwardly toward a delivery port between adjacent panels, a tubular spout of flexible material connected to the receptacle around the delivery port, said spout being arranged to be folded upwardly to effect closure of the port and to be lowered to a depending delivery position for permitting flow of fruit from the receptacle through the port.

References Cited by the Examiner

UNITED STATES PATENTS

| | | | |
|---|---|---|---|
| 494,875 | 4/1893 | Maund | 193—7 |
| 719,810 | 2/1903 | Jones | 193—7 |
| 2,927,705 | 3/1960 | Girardi | 214—83.1 |
| 3,182,827 | 5/1965 | Frost | 193—7 |

EVON C. BLUNK, *Primary Examiner.*

ANDRES H. NIELSEN, *Examiner.*